United States Patent [19]
Otsuka

[11] 3,982,730
[45] Sept. 28, 1976

[54] STRUT SPRING COMPRESSOR

[76] Inventor: Misao Otsuka, No. 8146-2 Oaza-Ishioka, Ishioka, Ibaragi, Japan

[22] Filed: June 10, 1975

[21] Appl. No.: 585,752

[30] Foreign Application Priority Data

June 11, 1974 Japan............... 49-67821

[52] U.S. Cl................ 254/10.5; 267/70; 29/218; 29/223
[51] Int. Cl.²............... B23P 19/04
[58] Field of Search............... 267/69, 70, 71, 72, 267/20, 166; 254/10.5, 100; 24/248 SA, 243 D; 29/218, 225, 223, 226, 256, 257, 258

[56] References Cited
UNITED STATES PATENTS

| | | | |
|---|---|---|---|
| 592,588 | 10/1897 | Hollister | 267/70 |
| 2,043,140 | 6/1936 | Wilmesherr | 254/10.5 |
| 2,509,274 | 5/1950 | Nugey | 267/70 |
| 2,714,002 | 7/1955 | Taylor | 267/20 R |
| 3,764,107 | 10/1973 | Mlynarczyk | 254/10.5 |

*Primary Examiner*—James B. Marbert
*Attorney, Agent, or Firm*—George B. Oujevolk

[57] ABSTRACT

A device for compressing a strut spring in the strut type car body independent suspension system, comprising two spring compressing plates which are U-shaped and which oppose to each other, and a threaded shaft which, when turned by an external force, changes the distance between the spring compressing plates so as to compress the strut spring.

1 Claim, 7 Drawing Figures

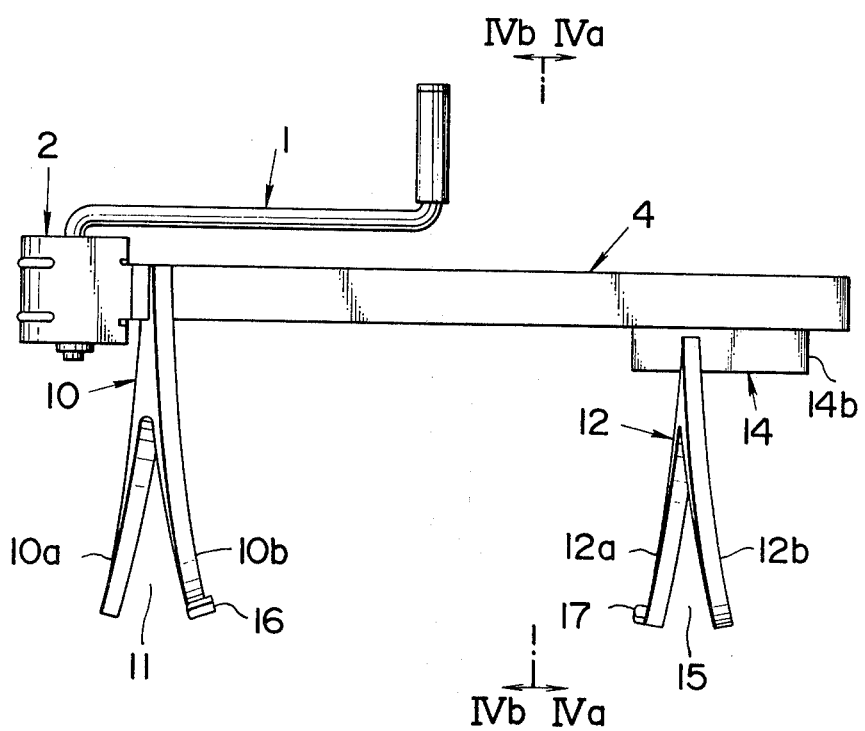
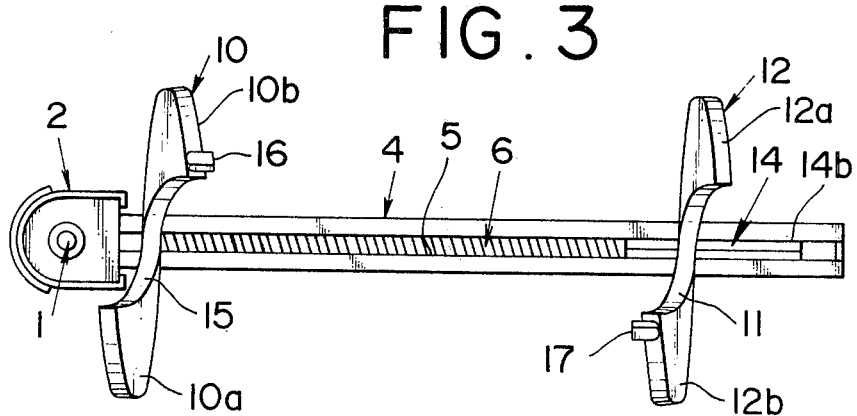

STRUT SPRING COMPRESSOR

BACKGROUND OF THE INVENTION

This invention relates to a compressor for compressing a strut spring which is used in the strut type car body independent suspension system.

As is known, in order to perform the repair, replacement etc. of a strut assembly component A shown in FIG. 6 or an internal component thereof, a strut spring B must first be compressed to the extent of becoming idle between upper and lower spring seats $C_1$ and $C_2$. The compression job is very difficult since the strut spring B is rich in rigidity.

According to prior art, compressing units E each of which has hooks $D_1'$ and $D_2'$ opposite to each other as shown in FIG. 1 are employed, and the strut spring B is compressed by changing the spacing between the hooks $D_1'$ and $D_2'$. The compressing unit E is so constructed that hook bodies $D_1$ and $D_2$ are fitted on a rod F, which is threaded at both ends, in a manner to freely float, a hook body stopping nut G is screwed outside one hook body $D_1$, and a tubular body H is fitted outside the other hook body $D_2$ in a manner to freely float, while a butterfly nut I is screwed outside the tubular body. By advancing the butterfly nut I rightwards, the hook body $D_2$ moves rightwards, and the distance between the hooks $D_1'$ and $D_2'$ diminishes.

Such compressing unit E cannot achieve the purpose singly, and usually three of the units must be used. For this reason, the job is laborious. Moreover, since the strut spring B is highly rigid, the job is difficult. Furthermore, it is feared that the strut spring B will come off from the hooks $D_1'$ and $D_2'$ in the course of the tightening thereof and will recoil so as to be restored and injure the worker.

SUMMARY OF THE INVENTION

This invention has been made in view of the aforementioned difficulties, and intends to provide a compressor with which a safe compression job can be executed by an extremely simple operation and which is suitably used for a strut spring etc.

BRIEF DESCRIPTION OF THE DRAWING

FIG. 2 to 6 illustrate an embodiment of a compressor according to this invention, in which FIG. 2 a side view, FIG. 3 is a bottom view, FIG. 5 is a longitudinal sectional view corresponding to FIG. 2, and FIG. 6 is a perspective explanatory view in an operating state.

PREFERRED EMBODIMENT OF THE INVENTION

Figure 1:
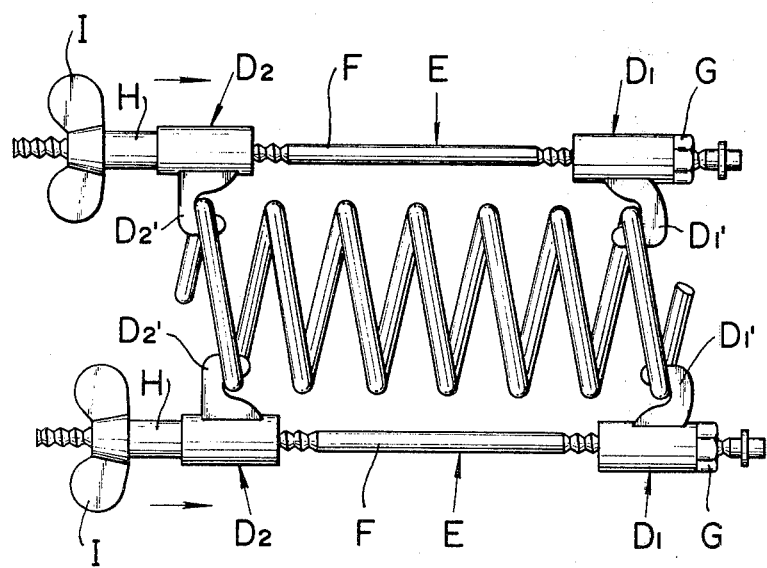
FIG. 1 is an explanatory view illustrating the compression job of a strut spring in a prior art.
Figure 4A:
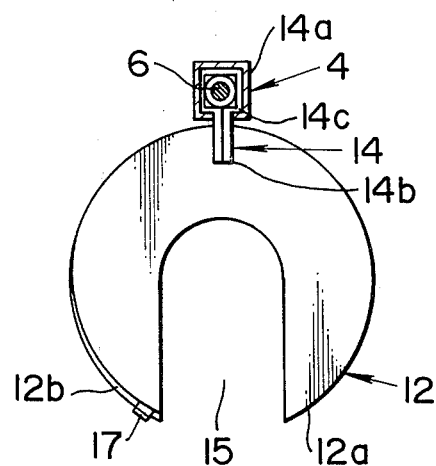
FIGS. 4(a) and 4(b) are sectional views taken along lines IV$a$ — IV$a$ and IV$b$ — IV$b$ in FIG. 2, respectively.

This invention will now be described in detail in connection with the embodiment illustrated in FIGS. 2 to 6. Numeral 1 designates a crank turning arm which is turnably supported by a base body 2. A gear 3 is fitted on that part 1a of the turning arm 1 which is received in the base body 2. Shown at 4 is a hollow, rod receiving member which has a longitudinal end secured to a side wall 2a of the base body 2 and which is longitudinally formed with a slot 5 on the underside. A turning threaded rod 6 is rotatably received in the rod receiving member 4. The fore end 6a of the turning threaded rod 6 is rotatably mounted borne by a cup-shaped, base end supporter 7 which is so disposed as to open to the base end side interior of the rod receiving member 4. Further, the upper end 6b of the turning bolt 6 penetrates through the side wall 2a of the base body and is rotatably borne by an annular head supporter 8 which is provided inside the side wall 2a of the base body. Reference numeral 9 denotes a gear which is secured to the head 6c of the turning threaded rod. A bevel gear mechanism is constructed of the gear 9 and the gear 3 of the turning arm 1, so that the turning of the turning arm 1 is transmitted to the turning bolt 6. A substantially U-shaped, spring compressing plate 10 is fixed to the outside of the end part of the rod receiving member 4 close to the base body 2. It has a notch 11 opened downwards. Shown at 12 is also a spring compressing plate, which opposes to the spring compressing plate 10. The distance of the spring compressing plate 12 from the spring compressing plate 10 can be varied by the drive of the turning threaded rod 6, that is, the turning of the turning arm 1. In the illustrated embodiment, a mechanism for the movement of the spring compressing plate 12 is constructed as will now be stated. Numeral 13 denotes a movable member which is received in the rod receiving member 4 and in which the turning bolt 6 is penetratingly inserted under the state of threadable engagement so as to freely turn. The movable member 13 has such outside dimensions that, even when the turning bolt 6 is turned, outer walls of the member 13 abut on inner walls of the rod receiving member 4 so as to prevent the member 13 from turning. Shown at 14 is a moving protuberant piece which is adapted to move rightwards or leftwards with the rightward or leftward movement of the movable member 13. It consists of a moving portion 14a which is received within the rod receiving member 4 and which is actually moved rightwards or leftwards by the movable member 13, and a protuberant piece portion 14b which is externally extended from the slot 5 of the rod receiving member 4. In the illustrated embodiment, a single plate is bent into a cross section as shown in FIG. 4(a), to form moving portion 14a on the upper side as has a rod inserting 14c and the protuberant piece portion 14b on the lower side. Besides, at a sideward part of the moving portion 14a, a movable member-abutting recess 14d is formed. In the moving protuberant piece 14 thus constructed, the rod inserting groove 14c has the turning rod 6 inserted therethrough, the moving portion 14a is situated within the rod receiving member 4, and the protuberant piece portion 14b is extended out of the slot 5 and is situated outside the rod receiving member 4. At this time, the movable member 13 inserted in the rod receiving member 4 is in the state in which it is received in the movable member-abutting recess 14d.

Figure 4B:
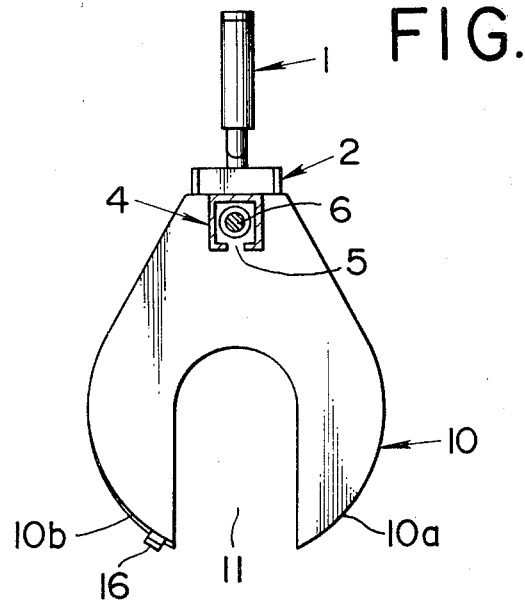
Figure 5:
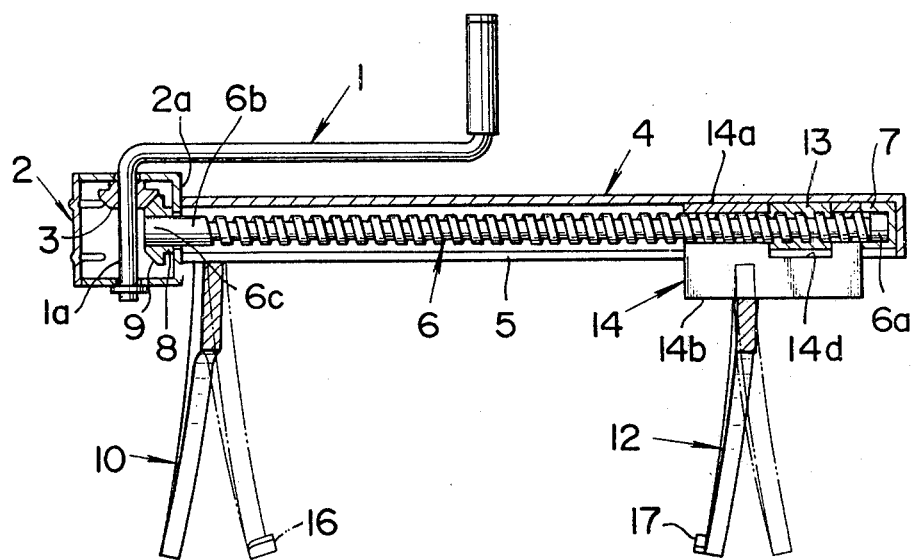
Figure 6:
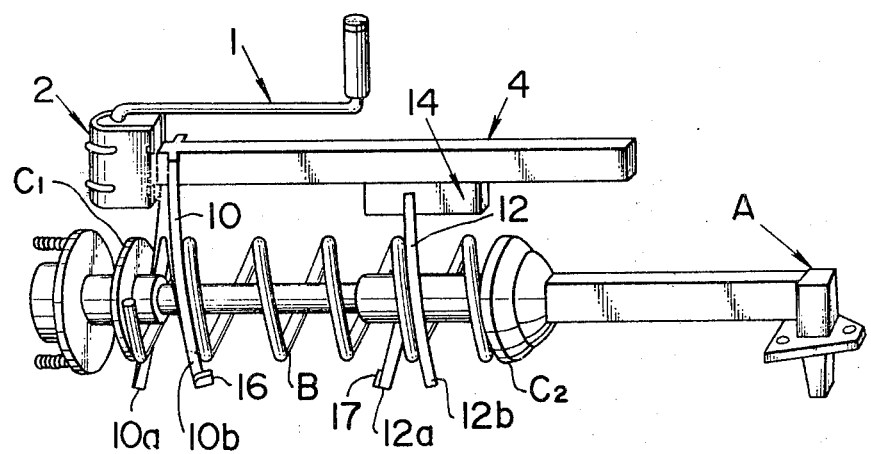

Furthermore, according to this invention, the shapes of both the spring compressing plates 10 and 12 have a characterizing features, which will be explained. In plan, both the plates are substantially U-shaped by forming notches 15 and 11 as shown in FIGS. 4($a$) and 4($b$), respectively. Referring first to that one 10 of the spring compressing plates which is fixed to the rod receiving member 4, compressing claws 10a and 10b which oppose to each other with the notch 11 located therebetween are curved in the form of a torsion so as to come away from each other, and they are thus caused to correspond to the slope of the coiled spring B. Referring to the other spring compressing plate 12 which is free to move, compressing claws 12a and 12b which oppose with the notch 15 located therebetween are curved similarly to the compressing claws 10a and 10b. Besides, engaging pieces 16 and 17 are fixedly provided at the tips of the opposing surfaces of those compressing claws 10b and 12b of the four compressing claws which are curved so as to come close to each other. Thus, where the compressor is actually applied to the spring B as illustrated in FIG. 6, the spring B is prevented from being disengaged from the compressing claws 10b and 12b.

The operation of the compressor will now be stated. When the turning arm 1 is turned, the turning force is transmitted through the bevel gears 3 and 9 to the turning shaft 6 and turns it. The movable member 13 intends to turn by the turning of the shaft 6, but its outer walls abut against the inner walls of the shaft receiving member 4 and it is checked from turning. The movable member 13 is therefore moved rightwardly or leftwardly within the receiving member 4. At this time, the movable member 13 shifts the moving protuberant piece 14 and accordingly the spring compressing plate 12 rightwards or leftwards, to change the distance between both the compressing plates 10 and 12.

As set forth above, this invention comprises the two U-shaped spring compressing plates 10 and 12 which oppose to each other, and the turning threaded rod 6 which is turnable by the external force so as to change the distance between the spring compressing plates 10 and 12. Therefore, the spring B which remains incorporated in the strut assembly component A can be compressed by the very simple operation of turning the threaded rod 6. In addition, by making appropriate the shapes of the spring compressing plates 10 and 12, it is preventable that the spring B is released in the course of the compression job.

I claim:

1. A strut spring compressor for compressing a spring in a strut assembly which spring comprises an elongated straight element having first and second spring seats ($C_1$, $C_2$) separated from each other with the spring coiled around straight element and held between said seats, said strut spring compressor comprising:
   a. an elongated hollow straight rod receiving member (4) with an elongated slot (5) therein with a base housing body (2) supporting a crank (1) with a gear drive (3) in said base housing body (2);
   b. a threaded turning rod (6) in said receiving member (4) with a driver gear (9) engaging said drive gear (3);
   c. a moveable protuberant piece (14) coupled to said turning rod (6) through said elongated slot (5) so that the turning of said crank (1) will turn said threaded turning rod (6) and move said protuberant piece; and,
   d. fixed and moveable spring compression plates (10, 12), said fixed plate (10) extending from the region of said base housing body (2) outwards from said slot (5), said moveable plate (12) extending from said moveable protuberant piece (14), said plates being substantially the same size each having a central open portion (11, 15) to encircle a spring to be compressed, said open section being defined by threadlike claws (10a, 10b, 12a, 12b), the pitch of said claws corresponding approximately to the coil of the spring with engaging pieces to engage the spring to be compressed at the tips of opposing surfaces of said claws.

* * * * *